United States Patent [19]
Wolcott et al.

[11] Patent Number: 4,853,573
[45] Date of Patent: Aug. 1, 1989

[54] EDDY CURRENT BRAKE ASSEMBLY

[75] Inventors: John H. Wolcott, Bristol; Herbert W. Wenman, Franksville, both of Wis.

[73] Assignee: Eaton Corporation, Cleveland, Ohio

[21] Appl. No.: 226,001

[22] Filed: Jul. 29, 1988

[51] Int. Cl.$^4$ .................. H02K 49/04; H02P 15/00
[52] U.S. Cl. ................................ 310/105; 310/93; 188/164; 188/267
[58] Field of Search .................. 310/58, 63, 93, 105; 188/164, 267

[56] References Cited

U.S. PATENT DOCUMENTS

| | | | |
|---|---|---|---|
| 3,624,436 | 11/1971 | Jaeschke | 310/93 |
| 4,476,410 | 10/1984 | Wolcott | 310/105 |
| 4,780,637 | 10/1988 | Wolcott | 310/105 |
| 4,791,330 | 12/1988 | Charbonnier et al. | 310/105 |

FOREIGN PATENT DOCUMENTS 0133962  10/1981  Japan .................. 310/105

Primary Examiner—Patrick R. Salce
Assistant Examiner—Judson H. Jones
Attorney, Agent, or Firm—M. L. Union

[57] ABSTRACT

An eddy current brake for braking the rotation of a rotating shaft driven by a drive including a rotatable, stamped one-piece inductor drum member connectable to a driven shaft, having a radially extending portion and an axially extending portion spaced from and substantially parallel to the axis of rotation of the driven shaft. A pole assembly is located within a volume defined by said drum member and is rigidly attached to an end adaptor plate of the drive. The pole assembly includes a pair of stamped pole members each defining a plurality of poles which are placed in a confronting, interdigitated relationship upon assembly. When energized, a flux path is established which sequentially passes from a coil located intermediate the pole members to one of said pole members, through the axially extending portion of the inductor drum, through the other of the pole members and back to the coil in order to magnetically couple the rotatable inductor drum to the rigidly mounted pole members in order to apply a braking force to the driven shaft of the drive.

17 Claims, 3 Drawing Sheets

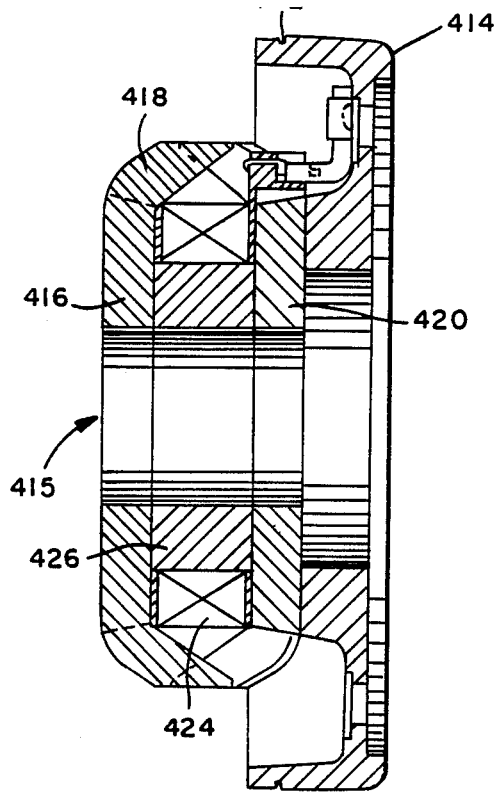
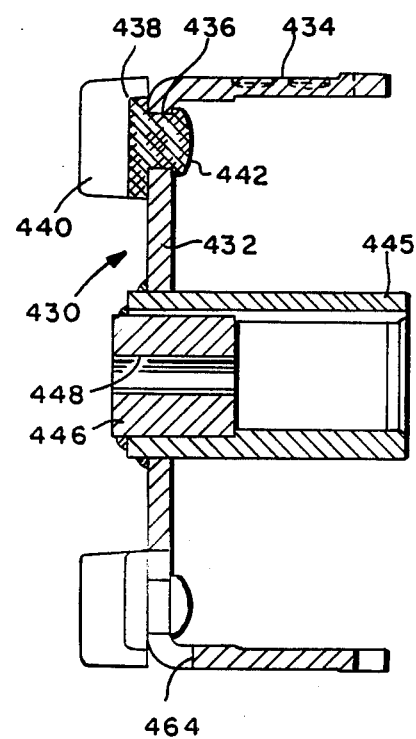

EDDY CURRENT BRAKE ASSEMBLY

TECHNICAL FIELD

The present invention relates generally to an eddy current coupling and in particular to an eddy current brake for use with an eddy current coupling.

BACKGROUND OF THE INVENTION

Eddy current couplings having a variable output speed are well known in the art. An example of such a coupling is disclosed in U.S. Pat No. 4,476,410 and in copending application Ser. No. 065,118 filed Jun. 22, 1987, now U.S. Pat. No. 4,780,637. Both the patent and application are expressly incorporated herein by reference.

Eddy current couplings which are known in the art may be equipped with a brake assembly for braking rotation of the output shaft. In the past, an eddy current brake has been mounted on the housing of the eddy current coupling coaxial to the output shaft. The brake in the prior art would be connected to the output shaft to effect braking thereof. When the field coil of the brake is energized the output shaft of the eddy current coupling will be braked.

In at least one prior art construction, the inductor of the eddy current brake which was attached to the output shaft of the eddy current coupling, revolved within the stationary pole assembly. An air gap is maintained between the stationary pole assembly and the inductor drum. The magnitude of the air gap is small in order to provide efficient coupling between the inductor and pole assembly. In some of the known prior art construction, the heat generated during energization of the brake resulted in the expansion of the brake members thereby causing the inductor drum to heat and expand into physical contact with the pole assembly thereby degrading the operation of the brake assembly. In addition, the known prior art brake mechanisms utilized specially manufactured parts to brake the output shaft of the eddy current coupling.

DISCLOSURE OF THE INVENTION

The present invention provides a new and improved eddy current brake for an eddy current coupling that is less expensive to manufacture than many prior art constructions and which reduces or eliminates the heat induced expansion problems experienced with some prior art constructions.

A provision of the present invention is to provide an new and improved eddy current brake assembly which is adapted to be easily mounted on an eddy current coupling and wherein parts of the eddy current brake are similar to parts of the eddy current coupling to thereby minimize the requirement for specially manufactured parts for the eddy current brake by utilizing parts from the eddy current coupling which can be modified to manufacture the eddy current brake.

Another provision of the present invention is to provide a new and improved eddy current brake for braking the rotation of an output shaft from an eddy current coupling including a rotatable one piece stamped inductor drum member, a non-rotatable pole means and an adaptor plate adapted to be secured to the eddy current drive for duly supporting the pole means coaxial to the axis of rotation of the output shaft and wherein the pole means includes a pair of pole members and a coil which when energized establishes a flux path to couple the pole means and the inductor drum.

Still another provision of the present invention is to provide a new and improved eddy current brake as set forth in the preceding paragraph wherein the eddy current drive is supported in the housing, a portion of the output shaft extends from the housing and further including a cover member connectable to the housing by a plurality of fastener means for covering the portion of the output shaft which extends from the housing, the cover member being removable from the housing by removing the plurality of fastener means and the adaptor plate being mountable to the housing coaxial to the portion of the output shaft which extends from the housing by the plurality of fastener means when the cover member is removed.

A still further provision of the present invention is to provide a drive package including a housing, an eddy current coupling located in the housing, and an eddy current brake. The eddy current coupling includes a driven input shaft, an output shaft, a cup shaped inductor drum connected to the input shaft, a pole assembly connected to the output shaft and a field coil for establishing a flux path for coupling the inductor drum and the pole assembly. The pole assembly includes a pair of pole members, each of which includes a plurality of peripheral poles located in confronted relationship to the inside surface of the cup shaped inductor member. The eddy current brake includes a cup shaped brake inductor drum connected to the output shaft for rotation therewith, a pair of brake pole members and a brake field coil for coupling the brake inductor drum and the pair of pole members. The cup shaped brake inductor member has a configuration substantially identical to the cup shaped inductor drum of the eddy current coupling and wherein at least one of the pair of brake pole members of the eddy current brake is a member having a configuration substantially identical to the configuration of the pole member of the eddy current coupling.

BRIEF DESCRIPTION OF THE DRAWINGS

FIG. 2 is sectioned view of a non-rotatable pole assembly and adaptor plate of the present invention;

FIG. 3 is a sectioned view of the inductor assembly;

BEST MODE FOR CARRYING OUT THE INVENTION

Figure 1:
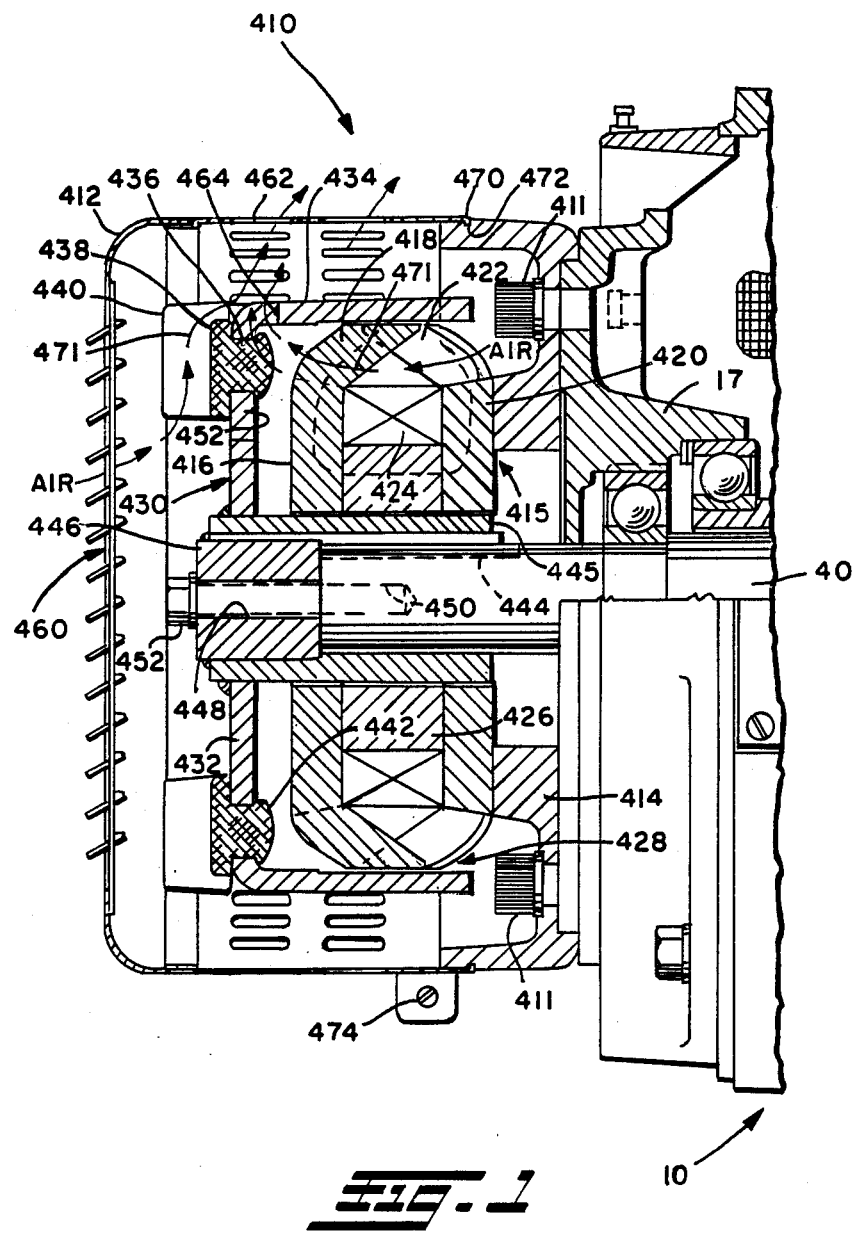
FIG. 1 is a partially sectioned view showing an eddy current brake.

FIGS. 1-4 illustrate an example of a dynamoelectric machine to which the present invention can be attached. The illustrated machine is the subject of the copending application Ser. No. 065,118 filed Jun. 22, 1987 and its subject matter is hereby incorporated by reference.

Turning now to the FIGS. 1-4, FIG. 4 discloses an electro-magnetic coupling 10 including a motor driven, variable-speed output power mechanism having a motor section 12 and an axially adjacent coupling section 11 contained in a single housing 14. The motor section 12 contains an electric motor which is of a conventional type comprising a stator 22 connected to the housing 14 and a rotor 24 secured to a hollow shaft member 25. Both the stator 22 and rotor 24 are of a laminated construction and the stator 22 is provided with field windings 26.

Figure 4:
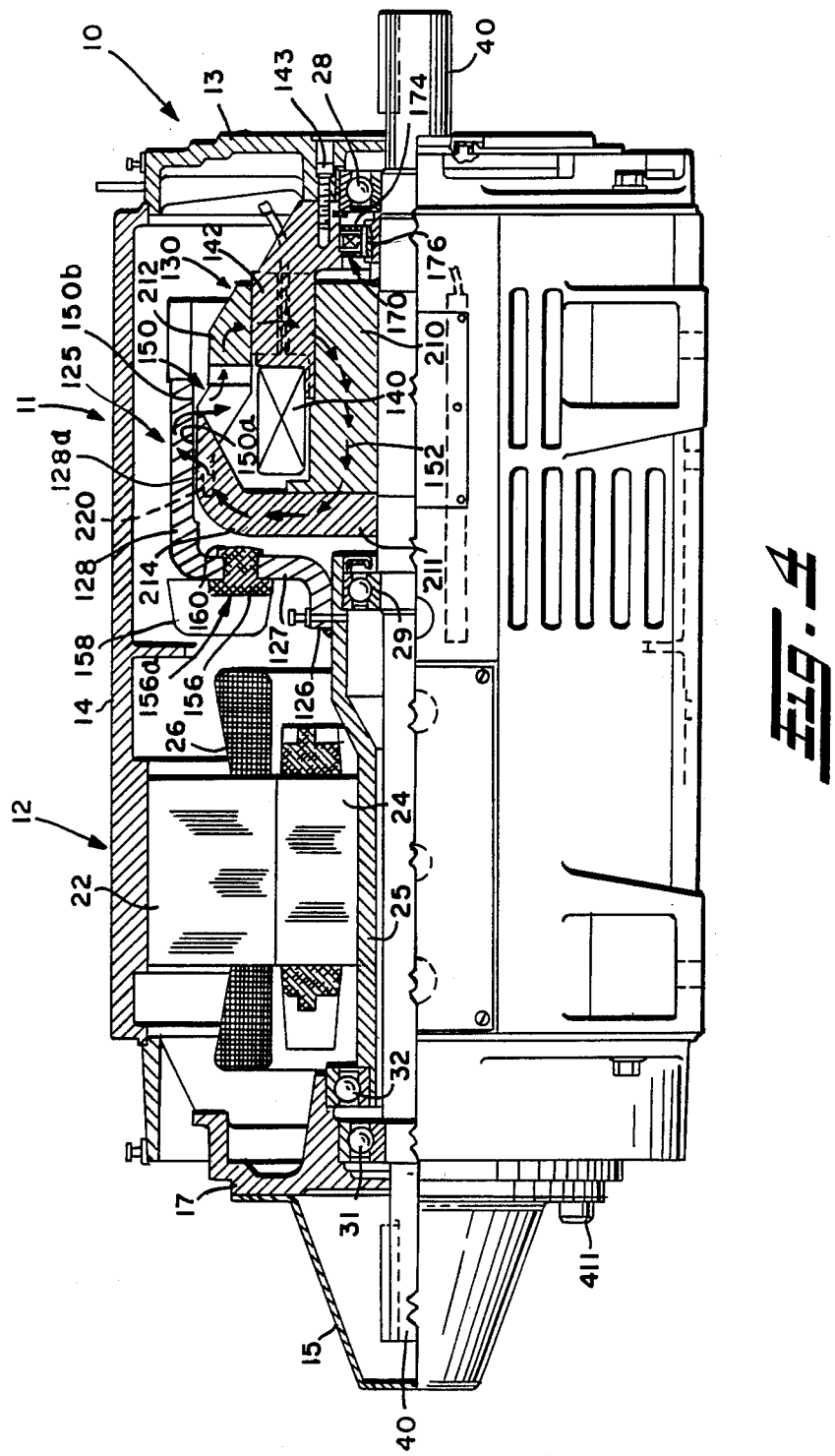
FIG. 4 is a partially sectioned view of an eddy current coupling without the brake assembly of FIG. 1 attached thereto.

The housing 14 is provided with several suitable bearing members. These bearing members include an anti-friction bearing 28 located in a cover 13, an intermediate pilot bearing 29 and bearing members 31 and 32 supported in an opposite end member 17 of the housing 14. The bearings 28, 29, 31 and 32 support the shaft 25 and a coaxial output shaft 40 for rotation relative to housing 14. The shaft 25 is exemplary, and other coaxial shaft assemblies may be used as drive shafts. A cover member 15 may be attached to end member 17 by a plurality of bolts 411 to enclose the shaft 40 as is illustrated in FIG. 4.

When the shaft 25 is driven by the rotor 24 it is considered a power input shaft to the coupling section 11 and the shaft 40 is considered a power output shaft which is adapted to be connected to a driven load (not shown). The output shaft 40 is keyed at both ends to allow power take-off from either end of the coupling 10.

Connected to the drive shaft 25 for rotation therewith is an inductor assembly or inductor drum 125 including a hub portion 126, a radially extending portion 127 and a cylindrical inductor drum portion 128 which is composed of a ferro-magnetic material such as steel and which may have a substantially uniform magnetic reluctance.

Connected to the driven shaft 40 for rotation therewith is a magnetic field pole assembly or rotor assembly 130. The pilot bearing 29 is supported on the driven shaft 40 and supports the drive shaft 25 for rotation relative to the pole assembly 130. The pilot bearing 29 locates the inductor drum assembly 125 in the central portion of the housing 14 relative to the pole assembly 130 which is supported by the driven shaft 40 for rotation therewith. The pilot bearing 29 maintains a radial air gap or clearance between the inductor assembly 125 and the pole assembly 130 to provide for relative rotation therebetween.

The field pole assembly 130 surrounds an annular field coil 140 supported on a magnetic ring that serves as a coil support 142. The support 142 is connected to the housing cover 13 by threaded connectors 143. The pole assembly 130 carries 16 pole teeth or pole pieces 150 which are interdigitated in a manner to be described below.

The pole teeth 150 are disposed adjacent an inner-surface 128a of the cylindrical portion 128 of the inductor drum assembly 125. A narrow air gap or space is provided between the poles 150 and the drum inner-surface 128a to allow for relative rotation between the inductor drum assembly 125 and the pole assembly 130.

Energization of the field coil 140 establishes a flux path, represented by the arrows 152 in FIG. 4, which electro-magnetically couples the field pole assembly 130 and the inductor drum assembly 125 so that rotation of the inductor drum assembly 125 by the driven input shaft 25 connected thereto will effect rotation of the pole assembly 130 and the output shaft 40 connected thereto. The magnitude of the energization of field coil 140 controls the slip between the pole assembly 130 and the inductor drum assembly 125 in a known manner.

During the operation of the electro-magnetic coupling device 10, relative rotation between the pole assembly 130 and inductor drum assembly 125 results in the generation of eddy currents in the cylindrical portion 128 of the inductor drum. These eddy currents produce a magnetic field which permits the transmission of torque from the inductor drum assembly 125 to the pole assembly 130 as discussed above. Normally, a certain amount of "slip" occurs during the rotation of the inductor drum assembly 125 and the pole assembly 130 and such "slip", or difference in rotational speed generates heat in the inductor drum assembly 125.

The inductor drum assembly 125 includes a heat dissipating member 156 disposed on the drum's radially extending portion 127. The heat dissipating member 156 comprises an annular ring having a heat dissipating surface 156a thereon which includes a plurality of fins 158 extending therefrom in a direction substantially parallel to the axis of rotation of the drum assembly 25 and a plurality of fastening means or rivets 160 which also extend parallel to the axis of rotation but in a direction opposite to that in which the fins 158 extend. The heat dissipating member 156 is operable to rotate with the inductor drum assembly 125 and dissipate heat generated in the inductor drum assembly 125 by the eddy current action. The rivet members 160 are integrally formed with the heat dissipating member 156 and each rivet 160 is operable to be received in one of a plurality of openings disposed in the radially extending portion 127 of the inductor drum 125. After the rivets 160 are located in these openings the heads of the rivets are deformed to secure the heat dissipating member 156 to the inductor drum assembly 125.

A tachometer generator assembly 170 may be located in the housing 14. The tachometer generator 170 is operable to establish a signal on an output, not illustrated, indicative of the speed of the output shaft 40. This signal may be utilized by electrical circuitry, not illustrated, to control the speed of the output shaft 40, in a well known manner. The tachometer generator 170 includes a plurality of coils 174 which are supported by the coil support 142 adjacent permanent magnetic poles 176 disposed on the output shaft 40 for rotation therewith. The tachometer generator 170 is operable to have a current induced therein in coils 174, which is proportional to the speed of the output shaft 40.

The pole assembly 130 includes a stamped pole plate 211 and two axially extending, generally annular portions 210, 212 connected by a radially extending end piece 214 which is a portion of the stamped pole plate 211. While the plate 211 is described as a stamped member, it should be apparent that forged members, which are a type of stamping, could also be used instead of a simple stamping. The plate 211 defines eight spaced pole pieces or teeth 150a at a radially outward portion. The outermost annular portion 212 defines eight additional poles or teeth 150b, evenly spaced about the outer annular pole assembly and interdigitated with the teeth 150a formed on pole plate 211 to form air flow gaps therebetween.

Alternate teeth 150b bridge the air flow gaps and are connected (by welding) to the end piece 214 by anchor members 220 that bridge between the teeth 150a. The anchor members do not completely block the spacing between these teeth 150a so that air is allowed to circulate in the vicinity of the pole assembly 130. The air gaps between the two sets of teeth 150a, 150b promote air circulation and cooling of the pole assembly 130.

As seen most clearly in FIG. 4, the gap between the outer surfaces of the poles 150a, 150b and the inner inductor drum surface 128a is minimized to optimize eddy current coupling. Even with this minimal spacing the interdigitated finger arrangement fosters air flow in and around the coupling to effect cooling thereof.

FIG. 1 illustrates the construction of an eddy current brake assembly 410 constructed in accordance with a preferred embodiment of the invention. The eddy current brake assembly 410 may be attached to or form part of the dynamo-electric machine 10 shown in FIG. 4. In the disclosed construction, the eddy current brake assembly 410 would be attached to the left end of the dynamo-electric machine shown in FIG. 4. The left end cover 15 shown in FIG. 4 may be removed to accommodate the mounting of the brake assembly 410 and to accommodate a separate cover 412 for enclosing the brake assembly 410. In the preferred embodiment, the brake assembly 410 is mounted to the end member 17 by removing the bolts 411 to remove cover 15 from the end of the coupling 10. An adaptor plate 414 which supports the brake 410 is adapted to be secured by the bolts 411 to the coupling 10 in the same manner as the cover 15 was previously secured.

The adaptor plate 414 supports a fixed pole assembly 415. The pole assembly 415 includes a first stamped pole plate 416 which includes a plurality of poles 418 disposed thereon and a second pole plate 420 including a plurality of poles 422 thereon. The poles 418 and 422 are interdigitated in the same manner as the poles 150a and 150b. An axially extending annular support member 426 is provided to support a field coil 424 and is rigidly affixed to the pole plates 416 and 420 to positively locate the pole plates 416, 420 relative to each other. The field coil 424 is adapted to be energized in a well known manner by electrical leads, not illustrated.

An inductor drum 430 is adapted to be secured to the output shaft 40 to rotate therewith. The inductor drum 430 includes a radially extending portion 432 and an axially extending portion 434 which is spaced apart from the poles 418 and 422 by an air gap 428. The radial portion 432 of the inductor drum 430 includes a plurality of openings 436 therein which are adapted to receive and support an annular heat dissipating member 438 which is similar to the heat dissipating member 156 attached to the inductor drum 125 of the coupling 10. The heat dissipating member 438 included a plurality of axially extending fins 440 for dissipating heat from the inductor drum 430 and a plurality of rivets means 442 which extend through the openings 436 to secure the member 438 to the inductor drum for rotation therewith. An axially extending tubular member 445 is welded to the radially extending portion 432 of the inductor drum 430 to support the inductor drum on the output shaft 40. The output shaft 40 includes a keyway 444 which cooperates with a corresponding keyway disposed on the tubular member 445 to connect output shaft 40 to the inductor drum 430 when a key is located in keyway 444. An annular hub member 446 is secured to the inner surface of the tubular member 445 to axially locate the inductor drum 430 relative to the shaft 40. The hub member 446 includes an annular axial opening 448 therein which aligns with an axial threaded recess 450 disposed in the end of output shaft 40. A suitable bolt member 452 passes through the axial recess 448 and threadably engages with the axial recess 450 to secure the inductor assembly 430 to the output shaft 40 for rotation therewith.

When it is desired to brake the output shaft 40 of the coupling 10, the coil 424 is energized to establish a flux path 460 which couples the pole assembly 415 with the inductor assembly 430. Since the pole assembly 415 is rigidly supported relative to the housing 14 by the adaptor plate 414, coupling of the inductor assembly 430 to the pole assembly 415 will effect braking of the output shaft 40. The degree of coupling or breaking, as is well known, is controlled by the magnitude of current in the stationary field coil 424.

The coupling of the inductor assembly 430 and the pole assembly 415 to brake output shaft 40 generates heat in a well known manner. The heat generated by the "slip" between the inductor assembly 430 and the pole assembly 415 is concentrated in the axially extending portion 434 of the inductor drum 430, in the coil 424 and support therefore, and in the poles 418 and 422. Accordingly, the cooling of the brake 410 is critical in order to maximize the braking capacity of the brake 410.

A cover member 412 encloses the brake assembly 410 and includes a plurality of louvers or openings 460 and 462 therein to provide for the circulation of cooling air through the brake assembly 410. The louvers or openings 460 are disposed on the end or radially extending portion of the cover 412 and the louvers 462 are disposed on the axially extending portion of the cover 412. When the inductor assembly 430 rotates with the output shaft 40, the axially extending fan blades 440 establish a flow of cooling air outwardly through the louvers 462 and inwardly through some of the axially extending louvers 462 as is illustrated by the arrows 471 in FIG. 1. The flow of air created by the fan blades 440 creates a negative pressure at the air gap between the poles 418, 422 and the inductor assembly 430 to draw air over the interdigitated poles 418, 422 to cool the poles and draw air over the axially extending portion 434 of the inductor drum and the field coil 424. To this end the inductor drum 430 includes a plurality of openings 464 which provide for the axial flow of air between the interdigitated poles, through the opening 464 and through the louvers 462 to effect cooling of the eddy current brake 410

The cover member 412 includes an annular lip 470 which is adapted to engage and be supported in an annular groove 472 in the adaptor plate 414. After the lip 470 is disposed in the annular groove 472, a bolt 474 may be utilized to tighten the cover 412 in a circumferential manner into the groove 472 to thereby fix and support cover 412 on the adaptor plate 414.

It should be apparent that the configuration of the inductor drum 430 is substantially identical to the configuration of the inductor drum 125 and the configuration of the pole plates 416, 420 is substantially identical to the configuration of the pole plate 211. It should be noted that plate 211 is similar to plates 416, 420 except for the overall size of the pole plates. The same is true for inductor drum 430 and inductor drum 125 which is similar in construction but of a different size than drum 430. The couplings 10 are manufactured in a family of sizes and it is desirable to use the pole plate 211 and inductor drum 430 from smaller size couplings in the same family of couplings in the brake assemblies of larger size couplings such as is shown in the attached figures. This allows the minimization of the number of parts required to construct the family of coupling and brake assemblies. The present invention contemplates the use of coupling parts from smaller size couplings of the same family, to form the brake assembly 410. For example, except for size, the plate 416 of the pole assembly 430 is identical to the plate 211 of the pole assembly 125, the coil 140 can be identical or similar to the coil 424 and the drum member 430 on the brake 410 can be identical to the drum member 125 in the coupling 10. While slight variations in the construction of the inductor drums 430 and 125 are preset these variations are caused by manufacturing steps subsequent to the forming of the general configuration of the inductor drum by a stamping operation such as forging. For example, the exact mounting of the inductor drums 125 and 430 to the rotating shafts varies slightly and these slight variations are the result of the mounting requirements and both drums 125 and 430 are identical prior to the additional forming of the stamped inductor to comply with specific mounting requirements. Such a construction provides for reduced parts inventory and better parts exchangeability within a family of couplings without degradation of the performance of the couplings.

From the foregoing it should be apparent that a new and improved eddy current coupling assembly has been provided which utilizes an eddy current brake which is formed from standard components of smaller size couplings in the family of couplings. This provides an efficient structure for braking the coupling while minimizing the required number of parts to be stocked to service the eddy current brake and coupling assembly.

What we claim is:

1. An eddy current brake for braking the rotation of a driven shaft rotated by an eddy current drive, said eddy current brake comprising:
   (a) a rotatable inductor drum member connectable to the driven shaft for rotation therewith;
   (b) said inductor drum member being a one-piece stamped member including a radially extending portion and an axially extending portion spaced apart from and disposed substantially parallel to the axis of rotation of the driven shaft;
   (c) a non-rotatable pole means; and
   (d) an adaptor plate adapted to be secured to the drive for rigidly supporting said pole means coaxial to the axis of rotation of the driven shaft;
   (e) said pole means including a pair of pole members and a coil which when energized establishes a flux path which sequentially passes from said coil through one of said pole members, through said axially extending portion of said inductor drum member, through the other of said pole members and back to said coil to magnetically couple said rotatable inductor drum member and said rigidly supported pole means in order to brake rotation of said inductor drum member and said driven shaft of the drive which rotates with said inductor drum member.

2. The apparatus of claim 1 wherein said adaptor plate rigidly mounts said pole members and inhibits relative rotation between said adaptor plate and said pole members.

3. The eddy current brake of claim 2 wherein said inductor drum member is a cup shaped stamped member, said radially extending portion and said axially extending portion of said inductor drum member defining openings for providing cooling fluid flow whereby said inductor drum member is cooled during braking operations and wherein said inductor drum member includes a plurality of teeth extending axially from an edge of said axially extending portion, said teeth providing a means by which said inductor drum member can dissipate heat generated during braking.

4. The eddy current brake of claim 1 wherein said eddy current drive is supported in a housing and further including a cover member connectable to said housing by a plurality of fastener means for covering said portion of said drive shaft which extends from said housing, said cover member being removable from said housing by removal of said plurality of fastener means, said adaptor plate being mountable to said housing coaxial to said portion of said drive shaft which extends from said housing by said plurality of fastener means when said cover member is removed.

5. The eddy current brake of claim 3 wherein said pole means includes a pair of stamped pole members, each pole member defining a plurality of poles and said pole membes mounted in confronting relation such that said poles of said confronting pole members are placed in an interdigitated relationship.

6. The apparatus of claim 5 wherein said adaptor plate is configured such that when installing said eddy current brake on an existing drive, said adaptor plate replaces an end plate forming part of said drive.

7. The eddy current brake of claim 1 further including a cup shaped cover member for enclosing said inductor drum member and said pole means, said cup shaped cover member being supported on said adaptor plate and including a radially extending portion and an axially extending portion supported at one end by said radially extending portion and supported at the opposite end by said adaptor plate.

8. The eddy current brake of claim 7 wherein said adaptor plate includes an annular groove therein, said cover member including an annular lip disposed on said axially extending portion and wherein said annular lip is adapted to engage with said annular groove to support said cover member on said adaptor plate.

9. The eddy current brake of claim 8 wherein said radially extending portion of said cup shaped cover member includes a plurality of openings therein providing for the flow of a cooling fluid to said inductor drum member and said pole means to effect cooling thereof.

10. The eddy current brake of claim 9 wherein said axially extending portion of such cup shaped cover member includes a plurality of openings therein providing for the flow of a cooling fluid to said inductor drum member and said pole means to effect cooling thereof.

11. The eddy current brake as defined in claim 1 further including support means for supporting said inductor drum member coaxial to the driven shaft for rotation therewith, said support means including a cylindrical portion for surrounding a portion of the driven shaft and connected to said radially extending portion of said inductor drum member, an end portion disposed adjacent an end of the driven shaft, and fastener means for connecting said end portion of said support means and said driven shaft to enable said support means and said inductor drum member to rotate with the driven shaft.

12. The eddy current brake of claim 11 wherein said pole means has an annular configuration having an annular opening therein disposed coaxial to the axis of rotation of the driven shaft, said annular opening receiving said cylindrical portion of said support means therein and wherein said support means is adapted to rotate relative to said pole means with said driven shaft.

13. An eddy current brake for braking the rotation of a rotating shaft driven by an eddy current drive about an axis of rotation, said rotating shaft extending from a housing which surrounds said eddy current drive, said eddy current brake comprising:
   (a) a rotatable inductor drum member connectable to said driven shaft for rotation therewith, said inductor drum being a stamped member including a radially extending portion and an axially extending portion spaced apart from and substantially parallel to the axis of rotation of said driven shaft;

(b) a non-rotatable pole assembly rigidly attached to said housing of said drive, said pole assembly disposed substantially within a volume defined by said inductor drum member;

(c) said pole assembly including a pair of non-rotatable pole members and a non-rotatable coil which when energized establishes a flux path which sequentially passes from said coil through one of said pole members, through said axially extending portion of said inductor drum, through the other of said pole members and back to said coil to magnetically couple said rotatable inductor drum member and said rigidly supported non-rotatable pole assembly to brake rotation of said driven shaft of the drive;

(d) each of said pair of pole members including a plurality of peripheral poles, each pole defining a surface located in confronting, close proximity to but spaced apart from an inside surface of said axially extending portion of said inductor drum member such that said inductor drum member is located outside of said pole members so that thermal expansion of said inductor drum does not interfere with relative rotation between said inductor drum member and said pole members.

14. The apparatus of claim 13 wherein said eddy current drive includes a pole member and said pole members of said eddy current brake are substantially similar to said eddy current coupling pole member.

15. A drive package comprising a housing, an eddy current coupling located in said housing, an eddy current brake, said eddy current coupling including a driven input shaft, an output shaft, a cup shaped inductor drum connected to said input shaft for rotation therewith, a pole assembly connected to said output shaft for rotation therewith and a field coil for establishing a flux path for coupling said inductor drum and said pole assembly, said pole assembly including a pair of pole members each of which include a plurality of peripheral poles, each pole defining a surface located in confronting, close proximity to but spaced apart from an inside surface of said cup shaped inductor member, said eddy current brake including a cup shaped brake inductor drum connected to said output shaft for rotation therewith, a pair of brake pole members each of which includes a plurality of peripheral brake poles, each brake pole defining a surface located in confronting, close proximity to but spaced apart from an inside surface of said brake inductor member, and a brake field coil for coupling said brake inductor drum and said pair of pole members, said cup shaped brake inductor member having a configuration substantially identical to said cup shaped inductor drum of said eddy current coupling, and wherein at least one of said pair of brake pole members of said eddy current brake is a member having a configuration substantially identical to the configuration of one of the pole members of the eddy current coupling.

16. A drive package as defined in claim 15 further including an adaptor plate securable to said housing for supporting said eddy current brake.

17. A drive package as defined in claim 16 wherein said adaptor plate is securable to said housing coaxial to said output shaft, said adaptor plate non-rotatably supporting said pair of brake pole members and said brake field coil coaxial to said brake inductor member, said brake field when energized coupling said brake inductor drum rotatable with said output shaft to said non-rotatable pole members to brake rotation of said output shaft.

* * * * *